US012589792B2

(12) United States Patent (10) Patent No.: US 12,589,792 B2
Forte et al. (45) Date of Patent: Mar. 31, 2026

(54) STEERING COLUMN FOR A MOTOR VEHICLE

(71) Applicants:thyssenkrupp Presta AG, Eschen (LI); thyssenkrupp AG, Essen (DE)

(72) Inventors: Sebastian Forte, Mauren (LI); Imre Szepessy, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 426 days.

(21) Appl. No.: 18/277,941

(22) PCT Filed: Feb. 15, 2022

(86) PCT No.: PCT/EP2022/053698
§ 371 (c)(1),
(2) Date: Aug. 18, 2023

(87) PCT Pub. No.: WO2022/175278
PCT Pub. Date: Aug. 25, 2022

(65) Prior Publication Data
US 2024/0124046 A1 Apr. 18, 2024

(30) Foreign Application Priority Data
Feb. 22, 2021 (DE) ..................... 10 2021 201 640.5

(51) Int. Cl.
*B62D 5/00* (2006.01)
*B62D 1/16* (2006.01)
*B62D 15/02* (2006.01)
(52) U.S. Cl.
CPC .............. *B62D 5/006* (2013.01); *B62D 1/16* (2013.01); *B62D 15/022* (2013.01)

(58) Field of Classification Search
CPC .......... B62D 5/006; B62D 5/001; B62D 1/16; B62D 15/022; B62D 15/0215; B60R 16/027
See application file for complete search history.

(56) References Cited

U.S. PATENT DOCUMENTS

2003/0146038 A1* 8/2003 Mills ..................... B62D 5/001
180/422
2003/0184072 A1 10/2003 Andonian et al.
(Continued)

FOREIGN PATENT DOCUMENTS

CN 110505994 A 11/2019
DE 10312516 A1 10/2003
(Continued)

OTHER PUBLICATIONS

English Translation of International Search Report issued in PCT/EP2022/053698, dated May 17, 2022.

*Primary Examiner* — George C Jin
(74) *Attorney, Agent, or Firm* — thyssenkrupp North America, LLC

(57) ABSTRACT

The present disclosure relates to a steering column for a motor vehicle, comprising a steering shaft which is mounted so as to be rotatable about its longitudinal axis (L) relative to a carrying unit, a rotation limiter having an end stop for limiting the rotation of the steering shaft, and a rotary sensor coupled to the steering shaft by means of a torque-locked connection. In order to permit a greater operational reliability, the invention proposes that the rotation limiter has a threshold torque and, if said threshold torque is exceeded, the rotation of the steering shaft beyond the end stop is permitted, wherein the threshold torque is less than a maximum transmission torque of the connection between the steering shaft and rotary sensor.

15 Claims, 3 Drawing Sheets

(56)  References Cited

U.S. PATENT DOCUMENTS

| 2016/0059880 | A1 |  | 3/2016 | Bouvier et al. |
| 2019/0092375 | A1 | * | 3/2019 | Bodtker ................. B62D 5/001 |
| 2020/0070871 | A1 | * | 3/2020 | Du ..................... B62D 15/0215 |
| 2020/0398891 | A1 | * | 12/2020 | Szepessy ............. B62D 15/021 |
| 2021/0188352 | A1 | * | 6/2021 | Galehr ................... B62D 7/224 |
| 2023/0050365 | A1 | * | 2/2023 | Heo ....................... B62D 5/005 |

FOREIGN PATENT DOCUMENTS

| DE | 10 2016 206 610 | A1 | 10/2017 |
| DE | 10 2017 211 394 | A1 | 1/2019 |
| DE | 10 2018 209236 | A1 | 12/2019 |
| DE | 10 2019 210 096 | A1 | 1/2021 |
| DE | 10 2020 201 819 | A1 | 8/2021 |
| JP | 2007 261508 | A | 10/2007 |
| JP | 2017144960 | A | 8/2017 |
| WO | 2020/115920 | A1 | 6/2020 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2022/053698, filed Feb. 15, 2022, which claims priority to German Patent Application No. DE 10 2021 201 640.5, filed Feb. 22, 2021, the entire contents of which are incorporated herein by reference.

FIELD

The present disclosure generally relates to a steering column for a motor vehicle, and specifically to a steering shaft which is mounted so as to be rotatable about its longitudinal axis relative to a carrying unit.

BACKGROUND

The steering shaft is rotatably mounted in the carrying unit which can be fixedly connected to the vehicle body. In a preferred embodiment, the steering shaft is in a steering column housing which can be configured as a jacket unit or can have such a jacket unit, and which is carried by the carrying unit and preferably is adjustable relative thereto. For steering the motor vehicle, a manual steering command is input by the driver by rotating the steering wheel which is attached to the rear end of the steering shaft in the direction of travel on the driver's side, the steering command being converted into a steering angle of the steerable wheels of the motor vehicle.

While in a conventional steering system the steering shaft is mechanically connected to the wheels via a steering gear, in a steer-by-wire steering system the rotation of the steering shaft is detected by means of a rotary sensor which has at least one rotational angle sensor and/or torque sensor and is converted into an electrical control signal for activating electrical steering actuators. Due to the absence of the mechanical coupling with the wheels, the rotation of the steering shaft is not limited by the mechanical end stop of the wheels when the maximum steering angle is reached. Nevertheless, in order to avoid an excessive steering movement and also to simulate a realistic steering sensation, it is known to limit the maximum possible rotational angle of the steering wheel by means of a rotation limiter which forms a limiting device with an end stop for limiting the maximum possible rotation of the steering shaft.

A steering column with a rotation limiter is disclosed, for example, in DE 103 12 516 A1. In order to permit a steering angle over a plurality of revolutions, plates which are rotatable relative to one another are attached to the steering shaft and to the carrying unit, the plates having spiral tracks which repeatedly circulate relative to the longitudinal axis and which cooperate with one another via a positive connecting element sliding along therein. As said positive connecting element can strike positively against the end of the tracks, this forms an end stop which limits the relative rotation of the plates and thus the maximum possible rotational angle of the steering shaft. As a result, a reliable rotation limitation can be implemented with high degree of resilience relative to the introduced steering torque. A drawback, however, is that in the event of an overload, for example due to an extremely high steering torque acting in the event of an accident or exerted on the steering wheel due to misuse, the steering shaft and/or the rotation limiter can be impaired in terms of their function, for example rupture or be unreleasably blocked, such that the rotary sensor malfunctions. Thus if the steering shaft is separated from the rotary sensor, or if the rotation limiter is blocked, no control signals can be generated by the rotary sensor by rotating the steering wheel, whereby there is the risk of a total failure of the steering system.

Thus a need exists to permit a greater operational reliability in a steering column of the type mentioned in the introduction.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
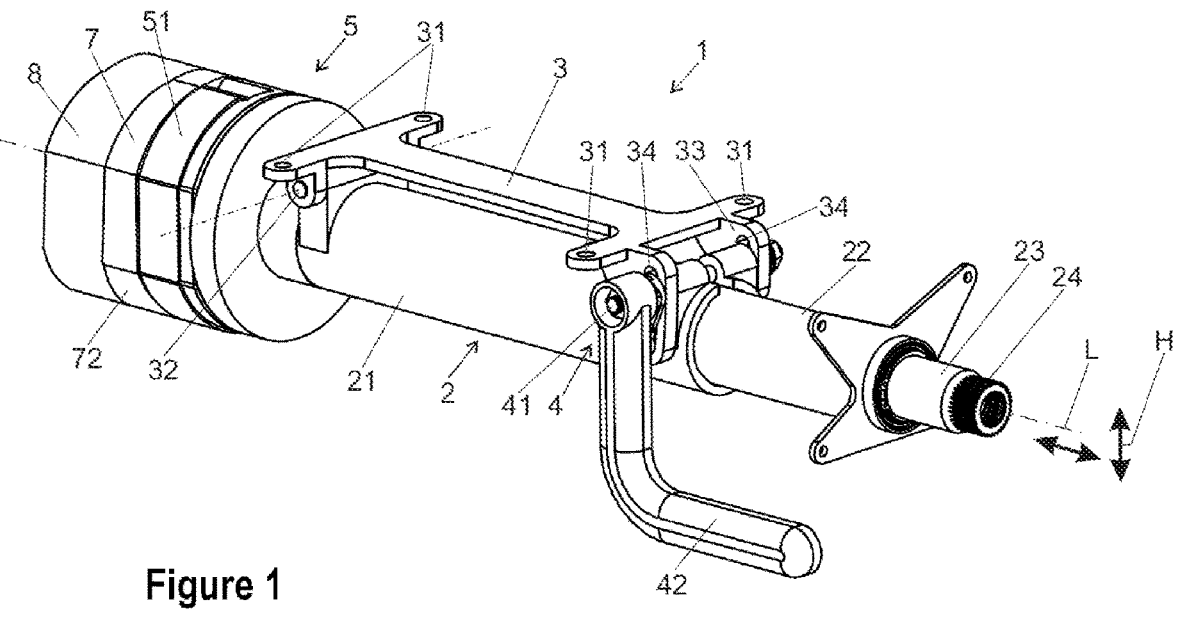
FIG. 1 shows a steering column according to the disclosure in a schematic perspective view.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In a steering column for a motor vehicle comprising a steering shaft which is mounted so as to be rotatable about its longitudinal axis relative to a carrying unit, a rotation limiter having an end stop for limiting the rotation of the steering shaft, and a rotary sensor coupled to the steering shaft by means of a torque-locked connection, it is provided according to the disclosure that the rotation limiter has a threshold torque (end stop breaking torque) and, if said threshold torque is exceeded, the rotation of the steering shaft beyond the end stop is permitted, wherein the threshold torque is less than a maximum transmission torque (connecting breaking torque) of the connection between the steering shaft and rotary sensor.

The disclosure is based on the novel concept of defining and adapting to one another the torque characteristics relative to the cooperation of the steering shaft with the rotation limiter and the rotary sensor, such that the function of the rotary sensor is more effectively ensured in the exceptional situations mentioned in the introduction.

According to the invention disclosure, the rotation limiter is designed such that it has a defined threshold torque which is equivalently denoted as the end stop breaking torque. If, during normal operation, the amount of steering torque input into the steering shaft remains below the threshold torque, the rotation of the steering shaft is stopped when the end stop is reached, and in the known manner the maximum possible steering angle is limited thereby. During this normal operation, the transmission torque conducted via the steering shaft to the rotary sensor is relatively small and substantially determined by the bearing friction of the steering shaft bearings, the rotation limiter and the rotary sensor.

If, in the event of an accident or due to misuse, an extremely high steering torque, which is higher than the threshold torque, is introduced into the steering shaft, the steering shaft is rotated further beyond the end stop. The threshold torque can also be exceeded if the rotation limiter malfunctions, for example in the case of a blockage before the end stop is reached. In the prior art, in both cases the risk is present of the malfunction of the rotary sensor, as explained above.

According to the invention disclosure, the connection of the steering shaft to the rotary sensor has a defined maximum transmission torque which is also equivalently denoted as the connecting breaking torque and specifies the maximum torsional load capacity. This connecting breaking torque according to the disclosure is related to the end stop breaking torque of the rotation limiter. In practice, the steering shaft and the connection to the rotary sensor are designed such that their torsional breaking strength is higher than the maximum achievable threshold torque when the end stop of the rotation limiter is exceeded due to pure brute force. This results in the advantage that the connection is always maintained between the steering shaft and the rotary sensor, even in the event of overload or a malfunction of the rotation limiter. In this manner, the functionality of the rotary sensor is ensured and the steerability of the vehicle remains guaranteed in the event of an accident or overloading due to misuse. As a result, the level of safety is increased.

In the case of overload, when either the rotation limiter reaches the end stop or is blocked due to a malfunction, the transmission torque which is applied between the steering shaft and the rotary sensor exceeds the threshold value of the rotation limiter. While in the prior art there is the risk that the connection of the steering shaft to the rotary sensor is severed, it is ensured by the higher connecting breaking torque according to the disclosure that the connection of the steering shaft is maintained and a manual steering command can still be detected by the rotary sensor.

In an advantageous development it can be provided that the steering shaft can be rotated at an angle of more than or equal to 180°, preferably more than 360°, between the end stops of the rotation limiter. It has been shown that steering angles from the left end stop to the right end stop of more than 180°, and in particular of more than 360°, is perceived as pleasant by the majority of vehicle drivers and permits sensitive steering.

In a further advantageous development, it can be provided that the steering shaft can be rotated by an angle of less than or equal to 900° between the end stops of the rotation limiter. It has been shown that steering angles from the left end stop to the right end stop of less than or equal to 900° is perceived as pleasant by the majority of vehicle drivers and permits a sufficiently direct steering.

An advantageous embodiment can provide that the rotation limiter has a predetermined breaking device. The predetermined breaking device is designed such that it releases a rotation of the steering shaft relative to the carrying unit when the defined threshold torque is reached or exceeded. In such an overload case the steering shaft can be rotated relative to the carrying unit, in particular beyond the end stop.

Preferably, the predetermined breaking device can have a predetermined breaking element which is attached between the steering shaft and the carrying unit. If the threshold torque is exceeded, this breaks and ensures a—for example irreversible—separation which puts the rotation limiter out of operation. As the predetermined breaking torque is less than the connecting breaking torque, this results in the advantage that the connection always remains reliably maintained between the steering shaft and rotary sensor in the event of the separation of the predetermined breaking element. A further advantage is that a predetermined breaking element can be provided in a structurally simple manner and with a small installation space requirement and a high functional reliability.

It can be provided that the rotation limiter has an overload clutch. Such an overload clutch can be inserted between the steering shaft and rotation limiter or between the rotation limiter and the carrying unit and/or integrated in the rotation limiter. If the threshold torque is exceeded, the overload clutch is decoupled, for example by—preferably reversibly—releasing a non-positive and/or positive engagement. For example, the overload clutch can be a friction clutch or slipping clutch which slips when the steering torque applied between the steering shaft and the carrying unit exceeds a defined maximum transmission torque. An advantage of such an overload clutch, in addition to a simple space saving and functionally reliable implementation, is that slipping in the event of overload can cause a misalignment of the end stop, but the basic functionality is substantially maintained so that repairs can be carried out by recalibration.

It can be provided that the steering shaft is connected fixedly in terms of rotation to a sensor shaft of the rotary sensor. Then the transmission torque or connecting breaking torque is determined by the torsional breaking strength of the steering shaft, sensor shaft and the rotationally fixed connection thereof, which can advantageously be provided with little effort. An effective option, for example, is that the steering shaft is configured in one piece with a sensor shaft of the rotary sensor. In other words, the steering shaft is configured with the rotary sensor so that the connecting breaking torque can be structurally predetermined simply by the cross section of the steering shaft and the material properties thereof.

A preferred embodiment can provide that the rotary sensor has a freely rotatable rotary encoder. In this design the rotary sensor has no internal angular end stop. The rotary encoder comprises a sensor element which is coupled to the steering shaft and which can be rotated about the longitudinal axis, for example a sensor shaft or encoder shaft, which can be endlessly rotated relative to a corresponding slave element which is stationary relative to the carrying unit. Such freely rotatable rotary sensors have the advantage that, if the end stop of the rotation limiter is exceeded in the case of overload, they are not damaged and can continue to deliver control signals.

It can be provided that the rotary sensor is configured separately from the rotation limiter. As a result, an end stop integrated in the rotary sensor is not required, the end stop being able to be designed to be correspondingly smaller and more cost-effective, preferably also with a freely rotatable rotary encoder. By the functional separation, the respective structural adaptation of the rotation limiter and rotary sensor can be optimized with little effort, in particular also regarding the embodiment according to the disclosure of the threshold torque and transmission torque, i.e. the transmission breaking torque or connecting breaking torque.

The rotary sensor can have, for example, an absolute value encoder or incremental encoder which preferably operates according to a contactless measuring method, for example inductively, capacitively, optically or the like. Such sensors can be obtained with the required specifications in many different designs and can be integrated with little effort into the steering column.

It is possible that at least two rotary sensors are provided. As a result, it is possible to provide a redundant measuring arrangement which increases the operational reliability and fail-safe operation. Preferably, different measuring principles can be used, whereby the operational reliability and fail-safe operation can be further increased and optionally also the measuring accuracy.

It can be preferably preferred that the rotary sensor has at least one rotational angle sensor and/or torque sensor. The rotational angle measurement permits the detection of steering commands which are input manually via the steering wheel for generating control signals. The torque applied to the steering shaft can be detected by means of a torque sensor in order to monitor, for example, the actual manual steering torque, and optionally to produce a realistic steering sensation by generating a feedback torque coupled into the steering shaft.

It is possible that the rotary sensor is configured to detect a rotation of the steering shaft beyond the end stop. As a result, it is possible to detect when the end stop has been exceeded, whereby an overload case can be reliably detected. This can be displayed and taken into consideration when generating steering and/or vehicle control signals, for example, by automatic activation of emergency measures. It is also advantageous that after the end stop has been exceeded during operation, rotational angle values and/or torque values can also be detected even if a misalignment could possibly occur.

The steering shaft can be mounted in a steering column housing held by the carrying unit. The steering column housing comprises the rotary bearing for the steering shaft and can be configured as part of a jacket unit or even form such a jacket unit itself. Known designs of jacket units have, for example, a guide box at least in some portions enclosing the steering shaft, one or more jacket tubes preferably coaxial to the longitudinal axis, or the like.

It can be provided that the steering column housing is stationary or is adjustable relative to the carrying unit in a longitudinal direction parallel to the longitudinal axis and/or in a vertical direction transversely to the longitudinal axis. The adjustment permits an adaptation of the steering wheel position to the driver's position. A longitudinal adjustment can take place by an adjustment of the steering column housing or the jacket unit relative to the carrying unit in the direction of the longitudinal axis, or by a steering column housing which is designed to be longitudinally adjustable in the longitudinal direction and which, for example, can have a jacket unit with jacket tubes arranged to be telescopically adjustable. The steering shaft can be fixedly arranged or adjustable relative to the steering column housing or to the carrying unit in the direction of the longitudinal axis.

A vertical adjustment can be implemented, for example, in a manner known per se by a jacket unit being mounted on the carrying unit so as to be pivotable up and down in the front region remote from the steering wheel in the direction of travel about a horizontal pivot axis arranged transversely to the longitudinal axis. As a result, the steering wheel, which is attached at the rear to the steering shaft in the vehicle interior, can be vertically adjusted.

If required, the longitudinal and vertical adjustment can be provided individually or in combination. The adjustment can take place manually or by means of motorized adjusting drives, which in a manner known per se can have in each case a spindle drive which can be driven in a motorized manner by an electrical actuating motor.

For generating a realistic driving sensation it can be provided that a feedback actuator is coupled to the steering shaft. To this end, it is known to detect parameters such as vehicle speed, steering angle, steering reaction torque and the like, from an actual current driving situation or to calculate these parameters in a simulation and to generate a feedback signal therefrom which is stored in a feedback actuator. The feedback actuator can preferably be integrated in the steering column of the vehicle and has a manual torque or steering wheel regulating unit with a drive unit, which depending on the feedback signal couples a restoring torque or feedback torque corresponding to the actual reaction torque into the steering wheel via the steering shaft. Such "force feedback" systems provide the driver with the impression of a real driving situation as in a conventional steering system, which facilitates an intuitive reaction.

In an advantageous embodiment, it can be provided that the rotation limiter has a winding core which is connected fixedly in terms of rotation to the steering shaft, an elongated strap element which is connected to the carrying unit and which is flexibly deformable transversely to its longitudinal extent being attached thereto and the strap element having at least one strap portion which can be wound onto the winding core in a winding direction about the longitudinal axis. The strap element can preferably be connected to a steering column housing in which the steering shaft is rotatably mounted and which is held by the carrying unit.

Such a rotation limiter has a flexible elongated strap element which is wound onto a winding core which is connected fixedly in terms of rotation to the steering shaft and on which the one, namely the inner, end of the strap element is fastened. The other outer end of the strap element is fixedly connected to the carrying unit or the steering column housing. The steering shaft can be rotated by actuating the steering wheel sufficiently far in a rotational direction which corresponds to the winding direction of the strap element that the strap portion of the strap element is fully wound tightly onto the winding core. As the strap element is tensioned between the winding core and the steering column housing, the maximum steering angle is limited and a further rotation is not possible in this rotational direction.

Such a rotation limiter can be designed with little effort and with a compact design for a relatively large steering angle range. An embodiment according to the disclosure can be implemented by the strap element having a predetermined breaking element which is configured, for example, as a predetermined breaking portion or predetermined tearing portion, in which the strap element is provided with a defined reduced cross section. This can be dimensioned in a simple manner such that the strap portion tears or breaks at a predetermined threshold value which corresponds to a defined threshold torque of the rotation limiter, and thereby releases the rotation of the steering shaft together with the winding core relative to the carrying unit or the steering column housing.

An advantage of this design is that the threshold torque can be predetermined in a simple, accurate and reliable manner by the construction of the predetermined breaking portion of the strap element.

An advantageous development can provide that the winding direction of the strap portion can be reversed. As a result, it is possible that the same strap portion can be coiled up or wound up selectively in a clockwise or anticlockwise winding direction in the same axial winding region of the winding core.

As a strap portion can alternatively be wound onto the winding core in both possible opposing winding or rotational directions, a rotational angle limitation can be implemented in both possible rotational directions by means of a single strap element. This results in the advantages that the production effort and assembly effort is lower than in the prior art in which two strap elements are required. Moreover, less installation space is required so that advantageously a compact design of the rotation limiter is made possible.

Preferably, the strap portion has a first surface and a second surface which is configured in the same direction, wherein the first surface can be brought into contact with the winding core in the one winding direction and the second surface can be brought into contact with the winding core in the reverse winding direction. In other words, the first surface or the second surface of the strap portion bears against the winding core, depending on the winding direction.

In the neutral position which corresponds to the central position of the steering system between the two end positions of the maximum rotational angle provided by the rotation limiter, i.e. the end stops or stop positions, according to the disclosure the strap element is unwound from the winding core. If the steering wheel is rotated to the right or left from the central position, the strap element is correspondingly wound clockwise or—in the reverse winding direction—anticlockwise onto the winding core. In both cases, the rotation limitation is reached when the available winding portion is wound onto the winding core. Then an end stop is produced in which the strap element takes up the steering torque applied between the winding core and the steering column housing.

This permits a simpler and more robust construction of the rotation limiter, which during operation runs very smoothly. Moreover, the function is less sensitive to component tolerances and dimensional tolerances.

In the stop situation, the strap element is subjected to tenside stress. Preferably, the strap element is stiffer in the pulling directionn than in at least one bending direction.

It can preferably be provided that the strap portion exerts a uniform restoring torque in both winding directions between the winding core and the carrying unit or the steering column housing, irrespective of the winding direction. The strap element is continuously bent back when wound up and exerts a restoring torque on the steering shaft due to the reaction force between the winding core and steering housing which counteracts the bending back. The amount of restoring torque is dependent on the flexible properties of the strap element. For the primary function of the rotation limiter, defining the rotational angle, it is essential that the restoring torque is as far as possible identical for both rotational directions of the steering wheel. In order to implement this in the disclosure, according to the disclosure the strap portion of the strap element is preferably symmetrically designed relative to the bending back when wound up. As a result, the bending portion can be bent back transversely to its longitudinal extent with the same force to the right or left, and correspondingly the winding onto the winding core in the winding direction and in the opposing winding direction requires substantially the same torque which is applied to the steering shaft as restoring torque. That this torque is the "same size" is understood to mean according to the disclosure that in each case the amount of restoring force corresponds within predetermined tolerance limits in the same winding state for a rotational angle.

An embodiment of the disclosure can be implemented by the winding core having an outer lateral surface. Preferably, this outer lateral surface is configured to be cylindrical. Preferably, this outer lateral surface is surrounded by a hollow cylindrical inner lateral surface of the steering column housing with a radial spacing. The cylindrical outer lateral surface has a winding portion with an axial width which is preferably adapted to the width of the strap portion. As according to the disclosure only one strap element is required in the axial direction, the axial dimension of the outer lateral surface can be smaller than in the prior art in which two spiral-shaped strap elements are arranged adjacent to one another in the axial direction. This results in the advantage of a more compact design. The outer lateral surface of the winding core is preferably arranged coaxially in a hollow cylindrical interior of the steering housing which surrounds the winding core over its circumference continuously or at least in segments. The hollow cylindrical interior can be configured in a drum-shaped or tube-shaped portion of the steering housing, the inner lateral surface thereof having a predetermined radial spacing from the outer lateral surface. It can preferably be provided that the steering housing is closed by a cover, preferably in an air-tight and/or liquid-tight manner, by using a corresponding sealing element.

The radial spacing between the outer lateral surface and inner lateral surface can preferably be dimensioned such that it is larger than a permitted minimum bending radius of the strap portion. This permitted minimum bending radius specifies how much the strap element can be bent back in a reversible manner transversely to its longitudinal extent, wherein no or at least no relevant plastic deformation of the strap element occurs. As a result, it can be ensured that, in the neutral central position between the winding core and the steering column housing, the strap element can be bent back transversely to its longitudinal extent from the one direction into the other direction for the reversal of the winding direction according to the disclosure.

It can be provided that the external diameter of the outer lateral surface is less than or equal to 0.5 times the internal diameter of the inner lateral surface. As a result, a radial spacing can be produced between the inner lateral surface and outer lateral surface which is more than or equal to 0.5 times the external diameter of the outer lateral surface, which corresponds to the bending radius of the strap portion when wound onto the winding core. Due to this relationship between the internal and external diameter, when the winding direction is changed the strap element is not bent back or at least not substantially more than when wound up. The bending stress of the material remains small, such that a plurality of reversals of the winding direction is possible without material damage, and a long service life and reliability is achieved.

It is possible that the length of the strap portion between the winding core and the steering column housing is smaller than the inner circumference of the inner lateral surface, preferably smaller than 0.5 times the sum of the inner circumference and outer circumference. In the neutral central position, the strap portion, which can be wound onto the winding core, is unwound from the winding core and is located freely between the inner and outer lateral surface. Due to the specified relationship, the strap portion can nestle over its entire free length from the inside against the inner lateral surface, so that when the winding direction is reversed, the strap portion can be bent back relatively little in the passage through the central position without damaging the material.

It is advantageous that the strap portion is configured as a tight strand between the winding core and the steering column housing. When the maximum permitted rotational angle is reached, the strap portion is wound onto the winding core and tensioned between the circumferential portions of the winding core and the steering column housing which are rotatable relative to one another. It is advantageous that the strap element is substantially placed under tension in the tight strand so that it can take up the steering torque input into the steering wheel in a reliable manner as tensile force, without additional support or safety measures being required. "Substantially placed under tension" means that in the case of comparative stress, for example according to the shape change energy hypothesis, at least 90% can be attributed to the tensile stress.

An advantageous embodiment is that at least two strap portions are provided. The strap portions can be arranged so as to be distributed over the circumference, preferably equally distributed. For example, according to the above-described embodiment, two tight strands can be connected radially opposingly to the outer lateral surface of the winding core and correspondingly to the steering column housing. As a result, advantageously a redundant arrangement can be provided, and this also provides a reliable rotational angle limitation even in the event of the malfunction of a strap portion.

An advantageous development provides that the strap portions can be wound over one another in at least two turns.

An advantageous development provides that at least two strap portions can be wound over one another in at least two turns. Preferably, depending on the rotational direction, two tight strands acting on the winding core in the same axial winding portion can be wound up together in the same winding direction. The two strap portions are wound over one another in the radial direction, so that the two strap portions are arranged in the form of a double-turn spiral. Advantageously two—or more—strap portions can be received without increasing the axial installation space on the winding core. As a result, a compact, redundant arrangement can be implemented.

The winding core and/or the steering column housing can have at least one transverse slot, through which the strap element is guided. A transverse slot forms a slot which, for example, can pass transversely to the longitudinal axis through the winding core. Correspondingly, a steering column housing surrounding the winding core in the shape of a drum can have for each strap portion a transverse slot passing transversely from the inner lateral surface radially outwardly. A strap element can be simply hooked into the transverse slot or the transverse slots, so that relative to the forces occurring when wound up and acting in the circumferential direction it is reliably fastened to the winding core and/or to the steering column housing in both winding directions. An advantageous development is that the transverse slot or the transverse slots is/are open on the front face, i.e. axially, so that a flat strap element can be axially inserted and fixed in the transverse slot over its width in the direction of the longitudinal axis.

It can be advantageous that the strap element is configured as a closed loop. A closed loop has an annular endless strap which, due to its closed shape, can be fastened with little effort without additional fastening elements, by being hooked on the winding core and on the steering column housing. For the hooking-in, for example, hook-shaped hangers or abutments can be arranged on the winding core and on the steering column housing. A reliable arrangement which can be implemented with little effort for fastening the closed loop can be provided by the strap element being passed through a transverse slot passing transversely through the winding core. The strap element exits from the transverse slot via two tight strands which exit radially outwardly diametrically from the winding core and which extend as strap portions to the inner face of the steering column housing and are passed through two outwardly continuous transverse slots—also arranged diametrically to one another relative to the longitudinal axis. The strap element is guided outwardly around the steering column housing between these two transverse slots. In the transverse slots the strap element is fixed in the circumferential direction relative to the outer lateral surface of the core element and also relative to the steering column housing. If the transverse slots are configured to be axially open, for the assembly the closed loop of the strap element can be inserted simply axially into the transverse slots. In this manner, a particularly reliable connection can be generated without further fastening means. An advantage of the reversal of the winding direction according to the disclosure is that the strap portions lead out from the transverse slots in the radial direction so that they can be bent back in both circumferential directions.

The strap element can preferably be configured from a fiber fabric, for example a cord. A fiber fabric can withstand high tensile loads due to the use of high-strength fibers—for example metal, aramid or carbon fibers or the like—and can be designed to be particularly flexible. The high degree of flexibility means that—in contrast for example to a spiral spring—only relatively small restoring forces occur with the bending deformation when wound up. This property is also denoted as slack or dimensionally unstable. As a result, the torque required for winding up and for reversing the winding direction is correspondingly small, and elastic restoring forces which are dependent on the rotational angle and which are not relevant and undesirable for the function of the rotary limiter do not occur or are negligibly small. A high tensile strength of the strap element with small dimensions can be implemented by the use of fibers having high tensile strength. The strap element can comprise, for example, a flat, belt-shaped, woven strap.

The strap element can comprise a plastics and/or a rubber material and/or glass material and/or a metal material or combinations thereof. Preferably, fiber composite materials can be used.

The same parts are always provided with the same reference signs in the various figures and are thus generally only cited or mentioned once.

Figure 2:
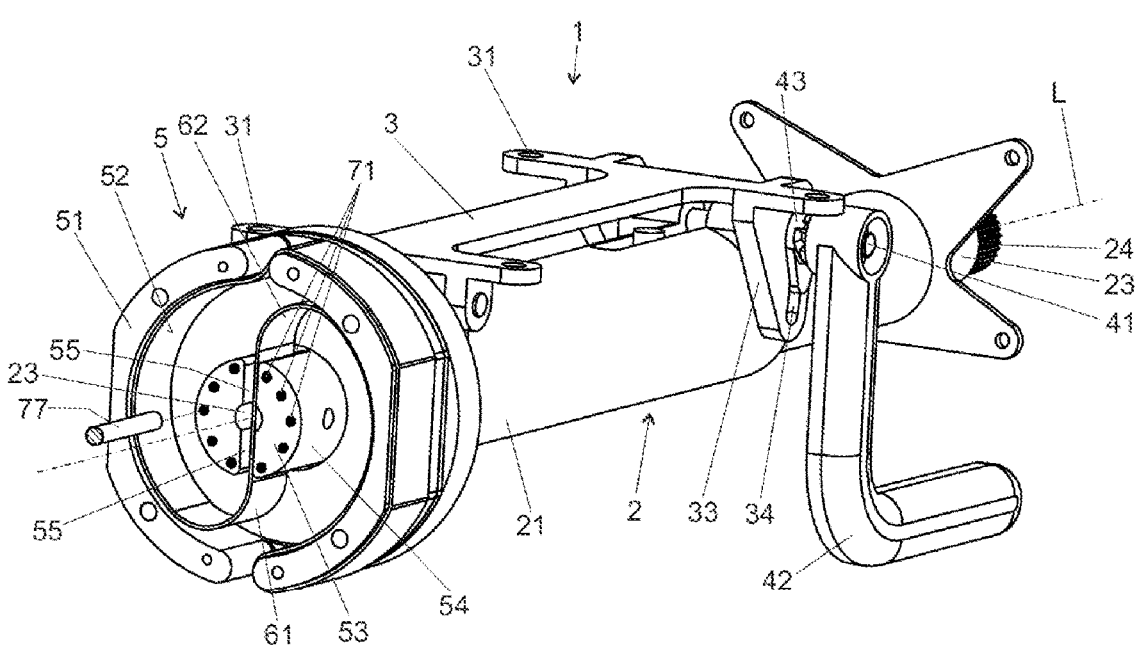
FIG. 2 shows the steering column according to FIG. 1 in a further perspective view.

FIGS. 1 and 2 show in various perspective views a steering column 1 of a steer-by-wire steering system, in FIG.

1 from the left to the rear and in FIG. 2 from the left to the front, in each case relative to the direction of travel.

The steering column 1 comprises an adjusting unit 2 which has a steering column housing 21 which also is denoted as the jacket unit or outer jacket tube. A jacket tube 22 in which a steering shaft 23 is rotatably mounted about the longitudinal axis L is received in the steering column housing 21. At the rear end relative to the direction of travel and facing the driver, the steering shaft 23 has a connecting portion 24 for attaching a steering wheel, not shown here. For the longitudinal adjustment of the steering wheel, the jacket tube 22 is adjustable telescopically relative to the steering column housing 21 in the direction of the longitudinal axis L, as indicated by the double arrow parallel to the longitudinal axis L.

The adjusting unit 2 is held by a carrying unit 3 which has fastening openings 31 for attaching to a body of a motor vehicle, not shown. In a front region, the steering column housing 21 is pivotably mounted on the carrying unit 3 about a horizontal pivot axis 32 located transversely to the longitudinal axis L, whereby a vertical adjustment of the rear end of the steering shaft 23 on the driver's side in the vertical direction H is possible.

The carrying unit 3 has two side walls 33 which are spaced apart to the rear from the pivot axis 32 and which extend downwardly parallel to one another and between which the steering column housing 21 is received.

A clamping device 4 comprises a clamping bolt 41 which is passed through slots 34 running in the vertical direction H through two side cheeks 33. A clamping lever 42, by which the clamping bolt 41 can be manually rotated about its axis, is fastened to the clamping bolt 41.

The clamping device 4 has a clamping gear 43 which converts a rotation of the clamping bolt 41 about its axis into a clamping stroke in the direction of its axis, for example by means of a V-pulley gear, cam gear or tilt pin gear, known per se. The clamping axis 41 is supported via the clamping gear 43 from outside against the two side cheeks 33. If the clamping lever 41 is rotated in the one direction into the clamping or fixing position by manual actuation of the clamping lever 42, the two side cheeks 33 are pushed against one another, and thereby the steering column housing is clamped between the side cheeks 33 and thereby fixed relative to the carrying unit 3 in the vertical direction H. The jacket tube 22 is also braced at the same time in the steering column housing 21 so that a fixing also takes place in the direction of the longitudinal axis L.

If the clamping lever 42 is moved by a reverse rotation into the released position, the clamping stroke is neutralized and the clamping of the steering column housing 21 between the side cheeks 33 is released. For the vertical adjustment, the clamping bolt 41 together with the steering column housing 21 then can be moved up or down in the elongated holes 34 in the vertical direction H, and for the longitudinal adjustment the jacket tube 22 can be telescopically pushed to the front or pulled out to the rear in the direction of the longitudinal axis L into the steering column housing 21.

Figure 5:
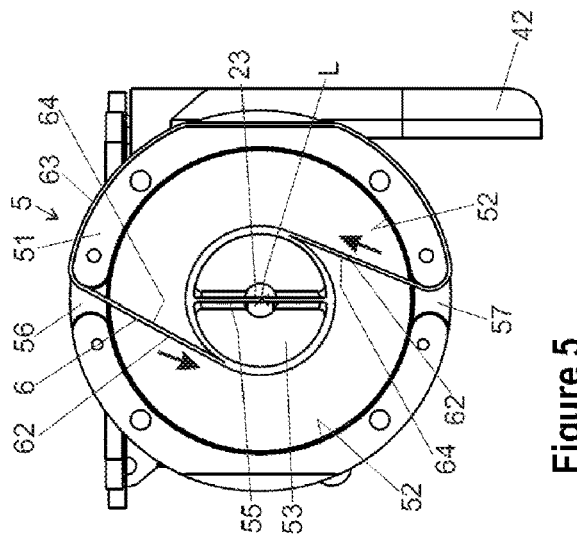
FIG. 5 shows a schematic axial view of the rotation limiter as in FIG. 3 in a third rotational angle position in the end stop (stop position relative to the rotation of the steering wheel to the left=clockwise).
Figure 4:
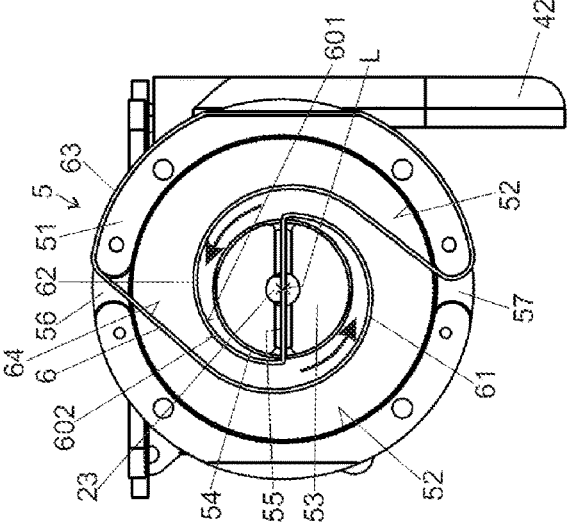
FIG. 4 shows a schematic axial view of the rotation limiter as in FIG. 3 in a second rotational angle position (intermediate position).
Figure 3:
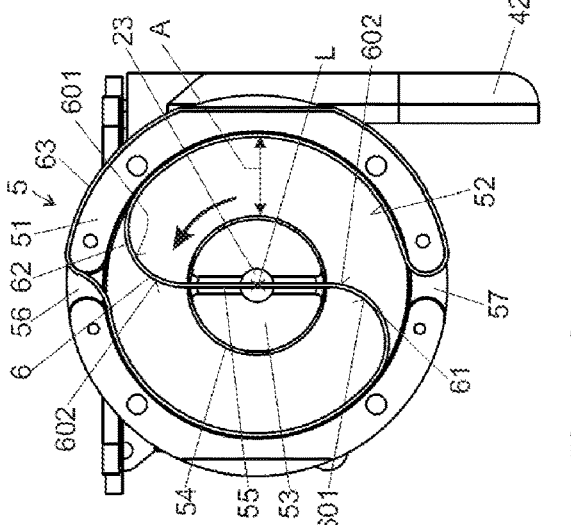
FIG. 3 shows a schematic axial view of the rotation limiter of the steering column according to FIGS. 1 and 2 in a first rotational angle position (neutral central position).

A rotation limiter 5 which is designed according to the disclosure is attached at the front to the steering column 1. This is shown open from the front in FIG. 2 in a perspective view, in order to expose a view into the interior. In FIGS. 3, 4 and 5 an axial view is shown from the front—in the direction of the longitudinal axis L—in various rotational angle positions of the steering shaft 23. The rotation limiter 5 is closable by a cover, not shown.

The rotation limiter 5 has a housing which is configured as a drum 51 and which forms a part of the steering column housing 21 with which it is integrally configured or fixedly connected. The drum 51 is configured to be hollow-cylindrical, with an inner jacket 52 which is arranged coaxially to the longitudinal axis L.

A winding core 53, which is connected fixedly to the steering shaft 23 and which has a cylindrical outer jacket 54 coaxial to the longitudinal axis L, is arranged in the drum 51.

The external diameter of the outer jacket 54 is preferably less than or equal to 0.5 times the internal diameter of the inner jacket 52. The inner jacket 52 has a radial spacing A (see FIG. 3) from the outer jacket 54 which is preferably more than or equal to 0.5 times the diameter of the winding core 53, i.e. the external diameter of the outer jacket 54.

The winding core 53 has a transverse slot 55 which passes diametrically transversely to the longitudinal axis L and which is open axially to the front. The transverse slot 55 opens diametrically opposingly into the outer jacket 54.

The drum 51 has two transverse slots 56, 57 which diametrically oppose one another relative to the longitudinal axis L and which form through-passages from the inner jacket 52 to the outer face of the drum 51, and which are also axially open on the front face.

A strap element 6 which is configured as a closed loop is attached between the winding core 53 and the drum 51 as is clearly identifiable in FIG. 3. The strap element 6 is a highly flexible flat strap with a width which is adapted to the axial width of the outer jacket 54, which corresponds approximately to the axial width of the inner jacket 52. The strap element 6 can comprise a high-strength fiber fabric or a cord composite and is highly flexible so that only a negligibly small elastic restoring force occurs when bent back transversely to its longitudinal extent and its width.

The strap element 6 is passed through the transverse slot 55 of the winding core 53 transversely to the longitudinal axis L, whereby the transverse slot 55 is provided with an insertion chamfer for effective protection against damage to the strap element 6. As a result, a connection of the strap element 6 to the winding core 53 is implemented fixedly in terms of rotation. The strap portion 61 radially exiting on the one side from the winding core 53 extends through the one transverse slot 56 to the outer face of the drum 51, and the strap portion 62 radially exiting on the other side from the winding core 53 extends through the other transverse slot 57 to the outer face of the drum 51. The strap portions 61 and 62 are connected together as a closed loop by a strap portion 63 guided externally around the drum 51. As a result, the strap element 6 is fixed in the circumferential direction relative to the inner jacket 52.

The function of the rotation limiter 3 is explained using the phase illustrations in FIGS. 3, 4 and 5, which in each case show different rotational angle positions of the steering shaft 23 and the winding core 53 connected thereto.

FIG. 3 shows the neutral central position. The two strap portions 61, 62 lead radially out of the transverse slot 55 and extend in an arcuate manner without tensile stress as far as the inner jacket 52 against which they nestle, up to the transverse slots 56, 57, where they are guided outwardly.

With a rotation of the steering shaft 23 clockwise, the winding core 53 rotates in the view of FIGS. 2, 3, 4 and 5 counterclockwise as indicated by the curved arrow.

FIG. 4 shows an intermediate position in which it can be clearly identified how the strap portions in the form of a double-turn spiral are wound onto the outer jacket 53 on the winding core 53.

The two strap portions 61, 62 are wound up further by a further rotation, until the remaining free regions of the strap portions 61, 62 are tensioned tightly as tight strands between the winding core 53 and the slots 56, 57 of the drum 51, as can be identified in FIG. 5. This represents a stop position, i.e. the end position of the maximum rotational angle in which the rotation limiter 5 is located in the end stop. A steering torque input via the steering wheel into the steering shaft 23 thus acts as tensile stress on the strap portions 61, 62 and a further rotation is prevented thereby.

Figure 6:
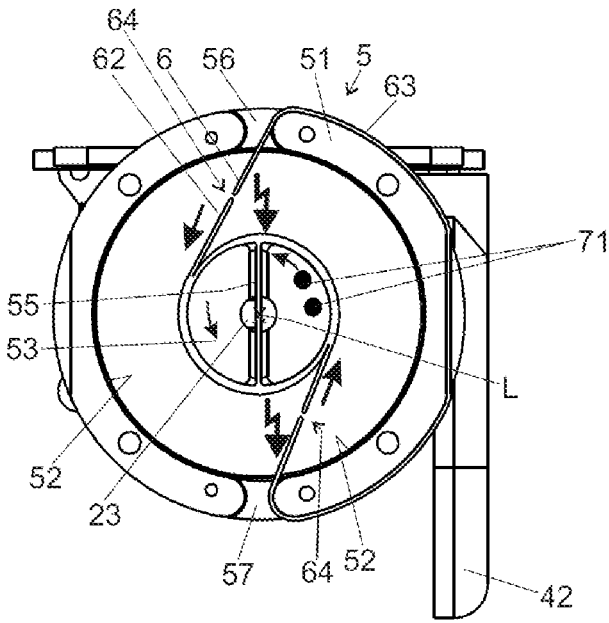
FIG. 6 shows a view as in FIG. 5 after the threshold torque has been exceeded (after an overload case).

In each case, a predetermined breaking portion 64 is configured in the region of a strap portion 61, 62, the strap cross section of the strap element 6 being locally reduced therein. As a result, the tear strength or tensile strength is sufficiently reduced in a defined manner up to a threshold tear strength (threshold tensile strength) that when a threshold torque directed against the end stop and exerted by the steering shaft 23 relative to the rotation limiter 5 is exceeded, namely the end stop breaking torque, the predetermined breaking portions 64 tear and are then severed as shown in FIG. 6, and release the further rotation of the steering shaft 23 relative to the steering column housing 23.

The steering shaft 23 is connected fixedly in terms of rotation to a rotary sensor 7 which is placed on the drum 51 of the rotation limiter 5, as shown in FIG. 1. Preferably, a one-piece shaft portion of the steering shaft 23 forms a sensor shaft of this rotary sensor 7. For example, magnetic elements 71, for example permanent magnetic elements, can be attached to the winding core 53 and in this manner can be fixedly connected to the steering shaft 23, as schematically shown in FIG. 2, in which a stationary sensor housing 72 of the rotary sensor 7 (stationary part of the rotary sensor 7), in FIG. 1 connected to the steering column housing 21, is removed. A plurality of magnetic elements 71, as shown, can be arranged so as to be distributed over the circumference and with a rotation of the steering shaft 23 can be rotated past a corresponding slave element 77 in the stationary sensor housing 72 of the rotary sensor 7. As a result, the rotational angle of the steering shaft 23 can be detected.

In FIGS. 3 to 5 the magnetic elements 71 are not shown in order to improve the clarity of the figures. In FIG. 6 only individual magnetic elements 71 are shown in order to increase the clarity. The magnetic elements 71 are shown only schematically in all of the figures.

Alternatively or additionally, rotary sensors 7 operating according to other measuring principles can also be provided, for example optical, capacitive, resistive sensors or the like. In particular, a Hall sensor or a different magnetic field sensor can be used.

It is essential to the disclosure that the steering shaft 23 can transmit a higher maximum transmission torque to the rotary sensor 7, which in any case is higher than the threshold torque. As a result, the function of the rotary sensor 7 can be ensured even if the overload case shown in FIG. 6 occurs when the strap element 6 is severed. In this case the steering shaft 23 continues to rotate together with the magnetic elements 71, as indicated in FIG. 6 by the curved arrows.

Each strap portion 61, 62 has a first surface 601 and a second surface 602 configured in the same direction, wherein the first surface 601 can be brought into contact with the winding core 53 in the one winding direction and the second surface 602 can be brought into contact with the winding core in the reverse winding direction. In other words, the first surface 601 or the second surface 602 of the strap portion 61, 62 bears against the winding core 53, depending on the winding direction.

Proceeding from the neutral position of FIG. 3, the steering shaft 23 can also be rotated in the opposing rotational direction. Then the strap portions 61, 62 can be wound onto the winding core 53 in a winding direction opposing the winding direction of FIGS. 4 and 5. Mirror-symmetrical arrangements to FIGS. 4 and 5 are then present.

The steering shaft 23 is operatively connected to a feedback actuator 8 which comprises an electric motor, wherein this electric motor is coupled to the steering shaft 23 such that a torque can be introduced thereby into the steering shaft.

LIST OF REFERENCE SIGNS

1 Steering column
2 Adjusting unit
21 Steering column housing
22 Jacket tube
23 Steering shaft
24 Connecting portion
3 Carrying unit
31 Fastening openings
32 Pivot axis
33 Side cheeks
34 Slot
4 Clamping device
41 Clamping bolt
42 Clamping lever
43 Clamping gear
5 Rotation limiter
51 Drum
52 Inner jacket
53 Winding core
54 Outer jacket
55 Transverse slot
56, 57 Transverse slots
6 Strap element
61, 62 Strap portions
63 Strap portion
64 Predetermined breaking portion
7 Rotary sensor
71 Magnetic element
72 Sensor housing (stationary part)
77 Slave element
8 Feedback actuator
L Longitudinal axis
H Vertical direction

What is claimed is:

1. A steering column for a motor vehicle, comprising:
   a steering shaft which is mounted so as to be rotatable about its longitudinal axis (L) relative to a carrying unit;
   a rotation limiter having an end stop for limiting the rotation of the steering shaft; and
   a rotary sensor coupled to the steering shaft by a torque-locked connection, wherein the rotation limiter includes a threshold torque wherein if said threshold torque is exceeded, the rotation of the steering shaft beyond the end stop is permitted, and wherein the threshold torque is less than a maximum transmission torque of the connection between the steering shaft and rotary sensor.

2. The steering column of claim 1, wherein the rotation limiter includes a predetermined breaking device.

3. The steering column of claim 1, wherein the rotation limiter includes an overload clutch.

4. The steering column of claim 1, wherein the steering shaft is connected fixedly in terms of rotation to a sensor shaft of the rotary sensor.

5. The steering column of claim 1, wherein the steering shaft is configured in one piece with a sensor shaft of the rotary sensor.

6. The steering column of claim 1, wherein the rotary sensor has a freely rotatable rotary encoder.

7. The steering column of claim 1, wherein the rotary sensor is separate from the rotation limiter.

8. The steering column of claim 1, wherein at least two rotary sensors are provided.

9. The steering column of claim 8, wherein the rotary sensor has at least one rotational angle sensor and/or torque sensor.

10. The steering column of claim 1, wherein the rotary sensor is configured to detect a rotation of the steering shaft beyond the end stop.

11. The steering column of claim 1, wherein a feedback actuator is coupled to the steering shaft.

12. The steering column of claim 1, wherein the steering shaft is mounted in a steering column housing held by the carrying unit.

13. The steering column of claim 12, wherein the steering column housing is adjustable relative to the carrying unit in a longitudinal direction parallel to the longitudinal axis (L) and/or in a vertical direction (H) transversely to the longitudinal axis (L).

14. The steering column of claim 12, wherein the rotation limiter includes a winding core connected fixedly in terms of rotation to the steering shaft, and an elongated strap element connected to the carrying unit, wherein the elongated strap element is flexibly deformable transversely to its longitudinal extent being attached thereto and the strap element having at least one strap portion which configured to be wound onto the winding core in a winding direction about the longitudinal axis (L).

15. The steering column of claim 12, wherein the winding direction of the strap portion is configured to be reversed.

\* \* \* \* \*